United States Patent [19]

Holsen et al.

[11] Patent Number: 5,571,489
[45] Date of Patent: Nov. 5, 1996

[54] PROCESS FOR CHROMIUM RECOVERY FROM AQUEOUS SOLUTIONS

[75] Inventors: Thomas M. Holsen, Oak Forest; Jan R. Selman; Subbarao L. Guddati, both of Chicago, all of Ill.

[73] Assignee: Illinois Institute of Technology, Chicago, Ill.

[21] Appl. No.: 380,851

[22] Filed: Jan. 27, 1995

[51] Int. Cl.$^6$ .......................... C01G 37/00; C01G 37/14; C01G 37/02; C01B 11/00
[52] U.S. Cl. .................. 423/53; 423/54; 423/58; 423/472; 423/595; 423/596; 423/597; 423/607
[58] Field of Search .................. 423/53, 54, 58, 423/61, 472, 595, 596, 597, 607

[56] References Cited

U.S. PATENT DOCUMENTS

| | | | |
|---|---|---|---|
| 2,574,065 | 11/1951 | Schulein | 423/595 |
| 2,793,937 | 5/1957 | East | 423/472 |
| 3,493,328 | 2/1970 | Nieuwenhuis | 423/58 |
| 3,843,769 | 10/1974 | Partridge et al. | 423/472 |
| 3,856,917 | 12/1974 | Texier et al. | 423/596 |
| 3,896,209 | 7/1975 | Fournier et al. | 423/53 |
| 4,092,439 | 5/1978 | Demazeau et al. | 423/607 |
| 4,242,127 | 12/1980 | Müller et al. | 423/24 |
| 4,349,514 | 9/1982 | Watanabe et al. | 423/54 |
| 4,446,026 | 5/1984 | Beutier et al. | 423/54 |
| 4,704,259 | 11/1987 | Lipsztajn | 423/55 |
| 5,112,583 | 5/1992 | Bruzzone et al. | 423/55 |
| 5,120,523 | 6/1992 | Nakao et al. | 423/22 |
| 5,260,039 | 11/1993 | Schwab et al. | 423/24 |
| 5,271,910 | 12/1993 | van der Meer et al. | 423/55 |

FOREIGN PATENT DOCUMENTS

| | | | |
|---|---|---|---|
| 1249841 | 9/1967 | Germany | 423/472 |
| 54-043172 | 4/1979 | Japan | 423/53 |
| 56-015883 | 2/1981 | Japan | 423/595 |
| 57-135724 | 8/1982 | Japan | 423/53 |

OTHER PUBLICATIONS

West, T. S., "Liquid–Liquid Extraction Procedures in Inorganic Analysis", *Metallurigia*, p. 47, Jul., 1956.

*Primary Examiner*—Steven Bos
*Attorney, Agent, or Firm*—Speckman, Pauley & Fejer

[57] ABSTRACT

A process for recovery of chromium in an aqueous solution comprising converting the chromium to chromyl chloride, separating the chromyl chloride from the aqueous solution, either as a heavy underlayer, or by extraction into a solvent, purifying the chromyl chloride, hydrolyzing the purified chromyl chloride to form a solution, and drying or precipitating the solution to form chromium, either as chromic acid or a chromate salt.

12 Claims, 3 Drawing Sheets

PROCESS FOR CHROMIUM RECOVERY FROM AQUEOUS SOLUTIONS

BACKGROUND OF THE INVENTION

1. Field of the Invention

This invention relates to a process for recovery of chromium from aqueous solutions, such as spent plating solutions and rinse waters used in the electroplating industry. The process is a total recovery and recycle method for chromium from concentrated aqueous solutions which generates no chromium waste as in other known processes for chromium recovery, such as precipitation and ion exchange.

2. Description of Prior Art

Chromic acid solutions are used for chromium plating, for the electrolytic stripping of copper, for the anodizing of aluminum, and for the passivation of cadmium, magnesium, and zinc. The chromic acid baths are contaminated by the buildup of trivalent chromium, formed as a result of the reduction of chromic acids, and other heavy metals such as aluminum, zinc, copper, and iron, which dissolve from the pieces being treated. These contaminants have several detrimental effects on the plating solution including increased voltages and plating times, increased pitting and noduling, and decreased current efficiency. In addition, as a result of increased levels of contamination, the quality of the plating deteriorates and a portion of the bath must be discarded, even though it still contains large amounts of chromic acid. Spent plating solutions from these processes present a major waste treatment problem.

Known methods for the recovery and use of hexavalent chromium include ion exchange, reverse osmosis, electrodialysis, ion flotation, and chemical means. Known methods for the removal and destruction of hexavalent chromium in industrial effluents include reduction-precipitation, selective pyrolysis, electro-coagulation, incineration, organic complexation, foam and ion flotation, and chemical methods.

U.S. Pat. No. 5,112,583 teaches a process for recovering chromic anhydride from exhausted aqueous chromium plating solutions by alkalizing the exhausted chromium plating liquid to a pH comprised between three (3) and seven (7) at a temperature of 70° C. with a commercial sodium hydroxide solution, keeping the mass in reaction at this temperature for an hour, followed by filtration to separate the precipitate formed. The filtered solution contains $CrO_3$ which is then reduced with sulfur dioxide to obtain a solution containing basic chromium sulfate and sodium sulfate, suitable for use as a tanning bath.

U.S. Pat. No. 4,704,259 teaches a process for the removal of chromium in the form of chromate from electrolytically produced aqueous chlorate solutions by the formation and precipitation of $Cr^{III}$ as $Cr(OH)_3$ by reduction of hexavalent chromium with a dithionite. In particular, hydroxyl ions are added to an aqueous chlorate solution in a sufficient amount to provide alkaline pH conditions and to permit trivalent chromium to form $Cr(OH)_3$, followed by an addition of dithionite to cause precipitation of $Cr(OH)_3$, after which the precipitated $Cr(OH)_3$ is separated from the aqueous chlorate solution.

U.S. Pat. No. 4,446,026 teaches a process and solvent for extraction of chromates in an aqueous solution in which the aqueous phase is brought into contact with an organic phase comprising 2–10% by volume of a solvent of tertiary or quaternary amines and a solvent of esters of phosphoric acid in a diluent based on petroleum hydrocarbons.

U.S. Pat. No. 4,349,514 teaches a process for recovery of reusable chromic acid from a waste chromic acid solution containing impurities in which the solution containing the chromic acid is introduced into the cathode compartment in an electro-dialysis process and free chromic acid or chromate ions in the solution are transferred to the anode compartment. $H_2SO_4$ is added to the heavy metallic ion contained in the outlet solution, in which chromic acid ion concentration is reduced, in order to convert chemical species of the contained metallic ion and increase the $H^+$ ion concentration. Chromate ions in the resultant solution are extracted into an organic phase by contact with an organic solvent. Residual amounts of chromic acid ion remaining in the aqueous raffinate are extracted into an organic phase by a second organic solvent.

U.S. Pat. No. 5,120,523 teaches a method for dissolving a metal, including chromium, by contact of the metal with a quaternary ammonium compound and a halogenated hydrocarbon or with a quaternary ammonium compound, a halogenated hydrocarbon and polar solvent.

U.S. Pat. No. 5,271,910 teaches a process for treating metal chloride wastes produced by chlorination of titanium ore in which the metal chloride wastes are leached in a hydrochloric acid-containing solution; dissolved metals are separated from the remaining solids in the solution to obtain a liquid and a residue; the metals are then selectively precipitated as their hydroxides by adding a neutralizing agent to the liquid; and the metal hydroxides thus obtained are separated from the liquid to produce a residue which is subsequently dewatered.

U.S. Pat. No. 5,260,039 teaches a process for two-phase extraction of metal ions from phases containing solid metal oxides in which the solid metal oxides are brought into contact with a hydroxamic acid, dissolved in a hydrophobic organic solvent, the phases containing the solid metal oxides and the organic phase being intensively mixed. After phase-splitting, the organic phase is separated and the metal ions are re-extracted from the organic phase in a known manner.

U.S. Pat. No. 4,242,127 teaches a method for processing a hydroxide sludge residue to recover nonferrous metal values therefrom which includes the steps of concentrating the residue and acidifying and heating the concentrated residue to produce a solution containing the nonferrous metals followed by separation of the nonferrous metals, including chromium, by high temperature pressure hydrolysis to obtain the metals as hydrated oxides or basic sulfates.

Finally, U.S. Pat. No. 4,092,439 teaches a process for preparation of chromium dioxide by oxidizing hydrated trivalent chromium oxide. See also West, T. S., "Liquid-Liquid Extraction Procedures in Inorganic Analysis", *Metallurigia*, Page 47, July 1956, which presents a general overview of liquid-liquid extraction procedures in inorganic analysis including methods for extraction of chromium.

Of all of the known methods, ion-exchange is considered to be the most efficient means of hexavalent chromium recovery and reuse from rinse solutions. However, this method is not feasible at higher concentrations of chromic acid. Reduction-precipitation is generally considered the easiest means of destruction of hexavalent chromium in aqueous solutions. However, this method is very expensive; there is no recovery of chromium; and large volumes of hydroxide wastes are generated. To the extent that chemical methods to oxidize $Cr(OH)_3$ sludge to reusable chromium (VI) have been investigated, they have been found to be unfeasible. To our knowledge, at the present time, there is no viable recycle and recovery technique for the commercial reprocessing of spent chromium plating solutions, particularly those which are high in chromium concentration.

SUMMARY OF THE INVENTION

It is an object of this invention to provide a process for total recovery and recycle of chromium from aqueous solutions such as plating solutions and rinse water used in the electroplating industry.

It is another object of this invention to provide a process for recovery of chromium in an aqueous solution which generates no chromium related hazardous waste, as in the case of precipitation and other processes, thereby eliminating the need to store chromium waste in landfills and the subsequent liabilities attendant thereto.

It is yet another object of this invention to provide a process for recovery of chromium from spent plating and rinse water solutions, which produces pure and concentrated solutions that can be recycled back into the plating bath.

Finally, it is an object of this invention to provide a process for recovery of chromium in an aqueous solution which produces either chromium trioxide, alkali salts or insoluble chromate salts that can be recycled back into the market place.

These and other objects are achieved by a process for recovery of chromium in an aqueous solution in accordance with one embodiment of this invention comprising converting the chromium in the aqueous solution to chromyl chloride, separating the chromyl chloride from the aqueous solution, hydrolyzing the chromyl chloride phase to form a solution of chromic and hydrochloric acids, and using either drying, crystallization/evaporation or precipitation methods, recovering the chromium, either as chromic acid, alkali salt, or insoluble chromate salt. Preferred reactants for converting the chromium to chromyl chloride are HCl liquid, HCl gas, chloride salts and mixtures thereof.

In accordance with one embodiment of the process of this invention, the chromyl chloride phase is separated from the aqueous solution as a heavy underlayer. Alternatively, in accordance with another embodiment of this invention, the chromyl chloride is separated from the aqueous solution by extraction into a solvent that can be distilled, which solvent can be recycled back into the process. More than 97% of the hexavalent chromium is separated as chromyl chloride without using any solvent.

BRIEF DESCRIPTION OF THE DRAWINGS

These and other features and objects of this invention will be better understood from the following detailed description taken in conjunction with the drawings wherein.

DESCRIPTION OF PREFERRED EMBODIMENTS

The process of this invention is a novel treatment technique, the chromyl chloride process, for the recovery of chromium from spent plating solutions. The process can also be used to recover and recycle chromium from rinse waters, although concentration of the rinse waters prior to implementation of the chromyl chloride process is probably necessary in order to make this process economical. The viability of this process at any plating facility depends on the quantity and concentration of spent solutions being generated. A potentially more efficient way of using the process of this invention is at a centralized treatment system where large quantities of spent solutions can be handled on a continuous basis, or as a portable process mounted on a mobile trailer.

Figure 1:
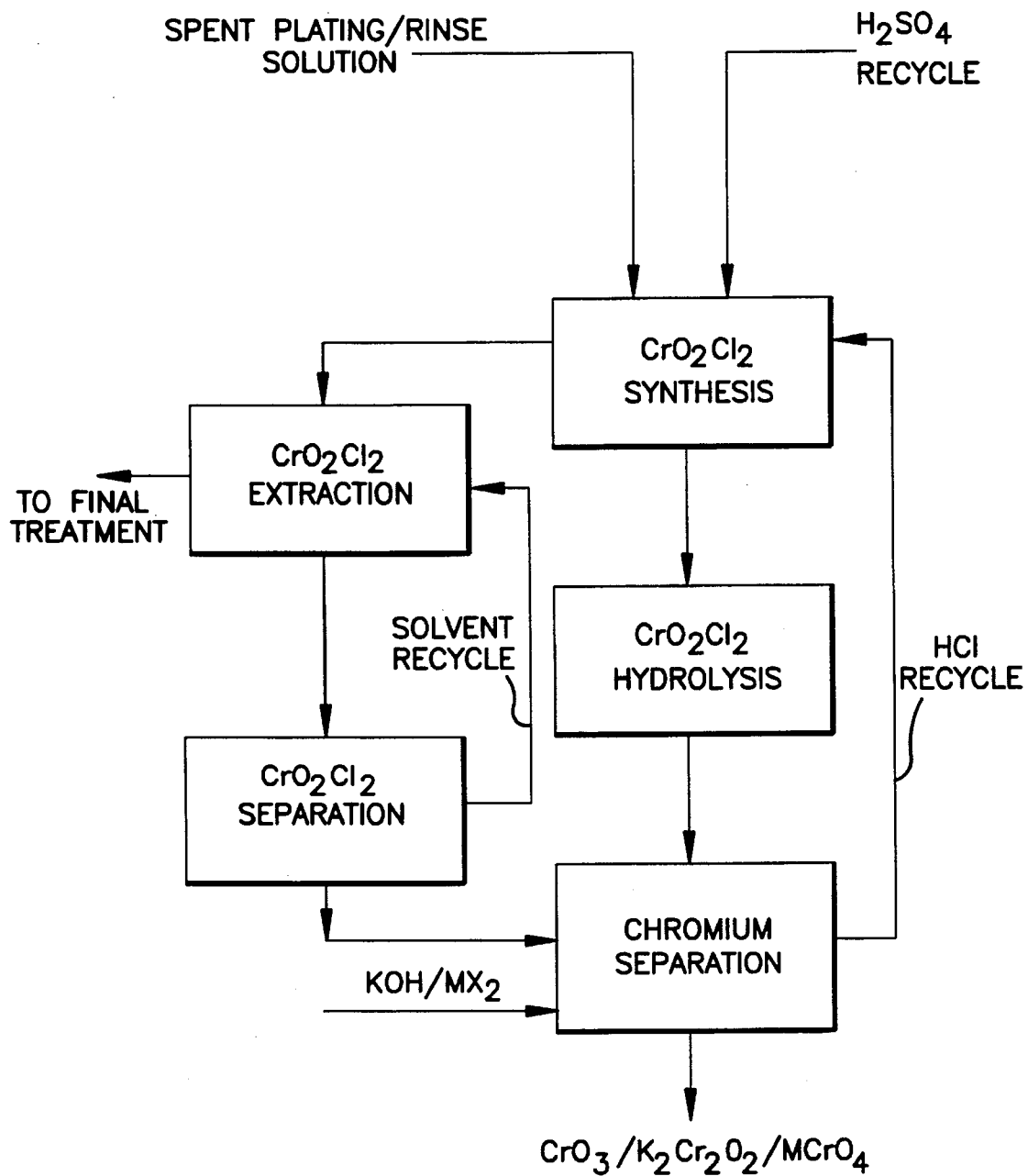
FIG. 1 is a flowsheet of the chromyl chloride process in accordance with one embodiment of this invention.

FIG. 1 shows a flowsheet for the process for recovery of chromium in an aqueous solution in accordance with one embodiment of this invention where chromium is separated from the spent plating solution by reacting dissolved chromic acid and hydrochloric acid in accordance with the following reaction:

$$H_2Cr_2O_7 + 4HCl \leftrightarrows 2CrO_2Cl_2 + 3H_2O \qquad (1)$$
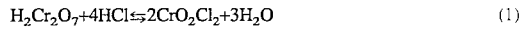

The chromyl chloride phase is then physically separated from the concentrated aqueous solution. This is followed by hydrolysis of the chromyl chloride phase and various separation steps to recover chromic acid.

Preliminary experiments have shown that, in the presence of HCl, an equilibrium exists between chromic acid and chromyl chloride. At ambient conditions, this equilibrium tends to the left. However, the equilibrium can be forced to the right by minimizing the activity of water, for example by adding $H_2SO_4$. Under controlled conditions, the chromyl chloride, in accordance with one embodiment of this invention, is separated from the aqueous solution as a heavy underlayer. At room temperature, chromyl chloride is a dark red liquid with a mean specific gravity of 1.92.

Alternatively, in accordance with another embodiment of this invention, chromyl chloride is extracted into a solvent, for example, benzene, carbon tetrachloride, carbon disulfide or chloroform. The extractant is then distilled to recover the solvent and the chromyl chloride, and the solvent is then recycled back into the process.

The separated chromyl chloride phase is then hydrolyzed to produce a solution of chromic acid and hydrochloric acid by the reaction (1) in reverse. The resulting solution is then dried and solid chromium trioxide recovered:

$$H_2Cr_2O_7 \ [+4HCl] \rightarrow 2CrO_3\downarrow + H_2O\uparrow \ [+4HCl\uparrow] \qquad (2)$$
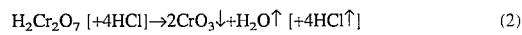

Alternatively, in accordance with one embodiment of the process of this invention, chromic acid is separated from the hydrolyzed solution as a pure chromate salt by contacting with an alkali solution such as KOH or KCl. The salt is then separated by a crystallization/evaporation method using the difference in boiling points of potassium dichromate solution and HCl.

$$H_2Cr_2O_7 + 2KOH \ [+4HCl] \rightarrow K_2Cr_2O_7\downarrow + H_2O\uparrow \ [+4HCl\uparrow] \qquad (3)$$

Another method, in accordance with another embodiment of this invention, of separating chromic acid comprises precipitating it as an insoluble chromate salt, for example, by adding lead or barium solution ($MX_2$):

$$H_2Cr_2O_7 + H_2O + 2MX_2 \rightarrow 2MCrO_4\downarrow + 4HX \qquad (4)$$

The hydrochloric acid, in accordance with one embodiment of this invention, is recycled back into the process. The pure metal product may be recycled back to the plating bath solution or resold. The $H_2SO_4$ raffinate solutions can also be recycled back into the recovery system.

We have conducted a series of experiments to determine the equilibrium conditions of reaction (1) set forth hereinabove. These experiments have shown that the temperature and reactant concentrations greatly affect the amount and stability of the chromyl chloride phase produced. Chromyl chloride is very stable when kept dry in the dark. At higher temperatures, or in the presence of light, $CrO_2Cl_2$ decomposes, releasing chlorine:

$$4CrO_2Cl_2 \rightarrow 2Cr_2O_3 + O_2 + 4Cl_2 \qquad (5)$$

It is likely that the decomposition occurs by means of an intermediate ion $CrO_3Cl^-$:

$$4CrO_3Cl^- \rightarrow Cr_2O_7^= + Cr_2O_3 + 2Cl^- + Cl_2\uparrow + O_2\uparrow \qquad (6)$$

and that this intermediate also plays a role in $CrO_2Cl_2$ formation:

$$Cr_2O_7^= + 2HCl \rightarrow 2CrO_3Cl^- + H_2O \qquad (7)$$

$$CrO_3Cl^- + 2H^+ + Cl^- \rightarrow CrO_2Cl_2 + H_2O \qquad (8)$$

We have divided the experimental task into three groups. These are (1) separation of chromic acid from spent plating solution as chromyl chloride; (2) hydrolysis of chromyl chloride; and (3) recovery of chromic acid from hydrolyzed chromyl chloride solution.

We have determined that the yield of chromyl chloride depends strongly on the initial concentration of the chromic acid in the spent plating solution as well as the concentrations of hydrochloric and sulfuric acids added to the reaction mixture. The yield of chromyl chloride weakly depends on the temperature of the reaction mixture. The decomposition of chromyl chloride strongly depends on the temperature of the system. Stirring provides a better control over temperature by suppressing temperature gradients and thereby prevents the local decomposition of chromyl chloride. Centrifugation of the reaction mixture, after completion of the reaction, facilitates phase separation and thereby increases the efficiency of chromium(IV) separation.

Figure 2:
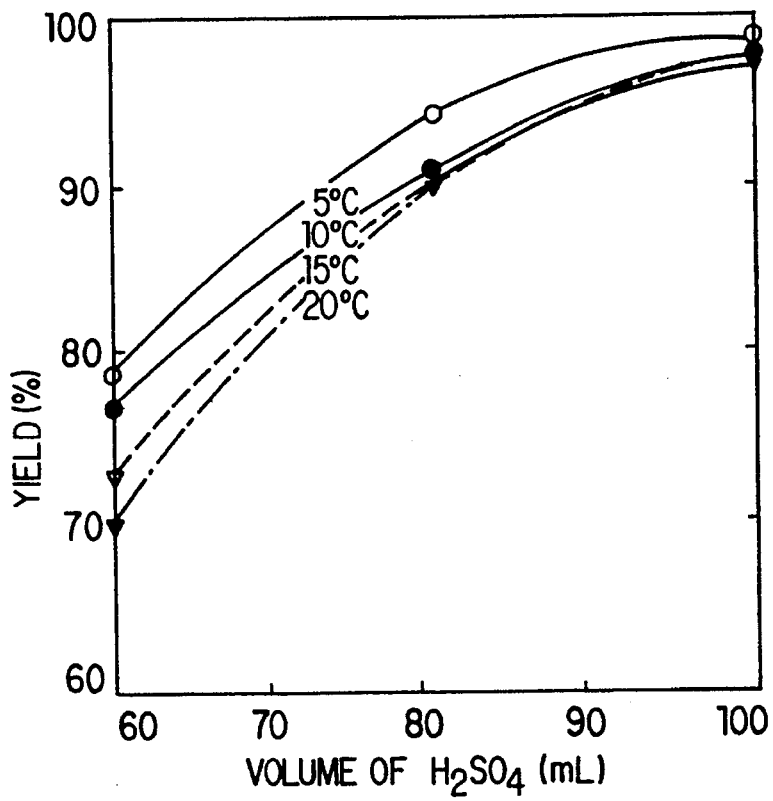
FIG. 2 shows the effect of sulfuric acid on chromyl chloride yield in accordance with one embodiment of this invention.
Figure 3:
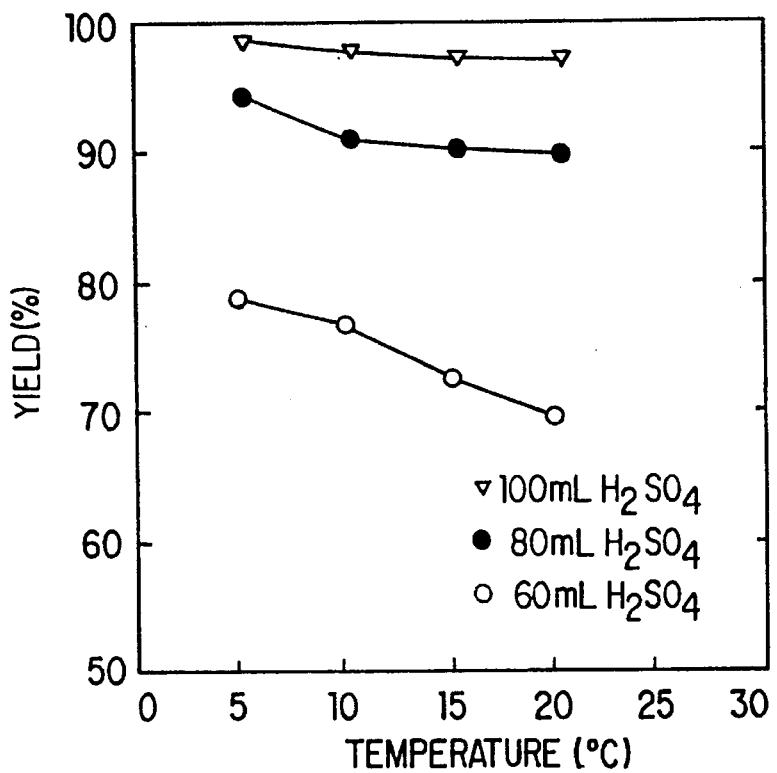
FIG. 3 is a diagram showing the effect of HCl on chromyl chloride yield in accordance with one embodiment of the process of this invention.

We have determined that the yield of chromyl chloride sharply increases with an increase in the quantity of $H_2SO_4$ added, due, in all likelihood, to a decrease in the water activity. For example, by increasing the quantity of concentrated $H_2SO_4$ added to the reaction mixture from 60 mL to 100 mL, the yield of chromyl chloride increased from 62% to 96% as shown in FIGS. 2 and 3. For increasing quantities of $H_2SO_4$ addition, the $CrO_2Cl_2$ yield increases by 10% to 40% depending on the concentration and quantity of HCl added initially and the temperature of the system. In the presence of higher concentrations of sulfuric acid (>10M), the chromyl chloride separates rapidly by itself and forms a clear and distinct phase. As a result, there is no need to centrifuge the reaction mixture or to add any solvent to extract chromyl chloride. Although sulfuric acid is necessary to minimize the activity of water, in the presence of excess concentrated sulfuric acid, the chromyl chloride decomposes and forms sulfates.

We have determined in the presence of small quantities of sulfuric acid, the yield of chromyl chloride increases sharply with an increase in the amount of HCl added and then decreases. This behavior is due to the fact that the initial addition of hydrochloric acid forces the equilibrium of reaction (1) set forth hereinabove to the right, increasing the chromyl chloride yield. However, further hydrochloric acid addition (which is 62% water by weight) increases the water activity excessively. This forces the reaction to the left. The effect is much more pronounced at low sulfuric acid concentrations. Increasing the amount of sulfuric acid added suppresses, in all likelihood, the activity of water and thereby increases the chromyl chloride production. The presence of excess HCl leads to a quantitative conversion of chromic acid into chlorochromate acid, as per reaction (7) set forth hereinabove. In addition, excess HCl leads to chlorine gas formation if the reactor is not kept cool (<20° C.). The maximum yield of chromyl chloride is obtained by dissolving chromic acid in more than the equivalent amount of concentrated HCl with an excess of $H_2SO_4$ acid present. At a given temperature and low sulfuric acid concentrations, excess HCl addition results in a decrease in chromyl chloride yield (FIG. 3). However, for high $H_2SO_4$ concentrations, this effect is negligible. The yield depends not only on the quantity of HCl acid added, but also on its concentration. The yield decreases with decreasing acid concentration until with about 20% HCl addition, only chlorine is produced.

Figure 4:
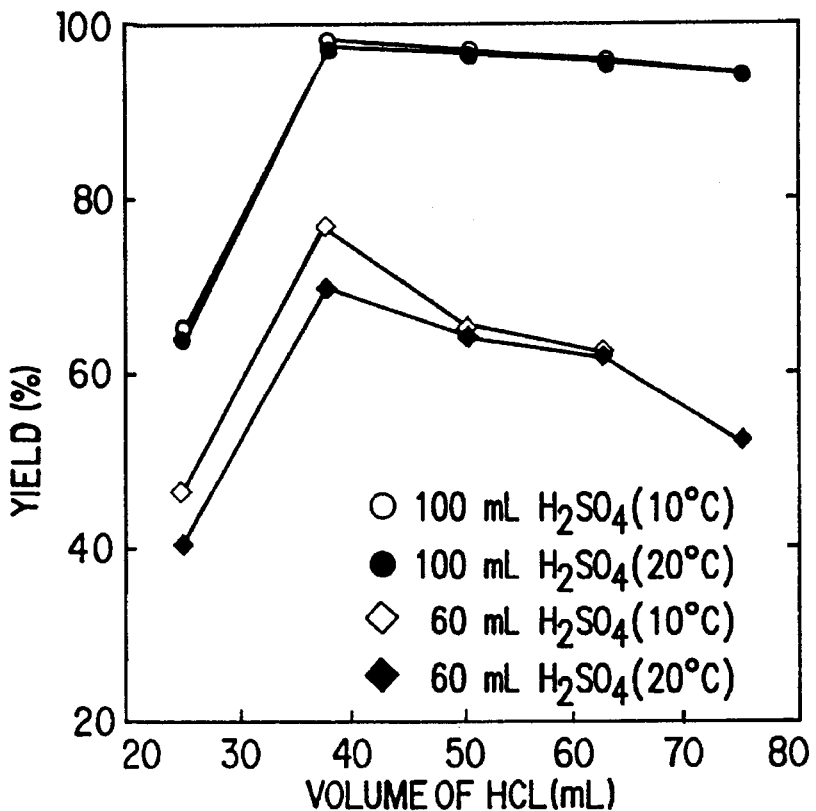
FIG. 4 is a diagram showing the effect of temperature on chromyl chloride yield in accordance with one embodiment of the process of this invention.
Figure 5:
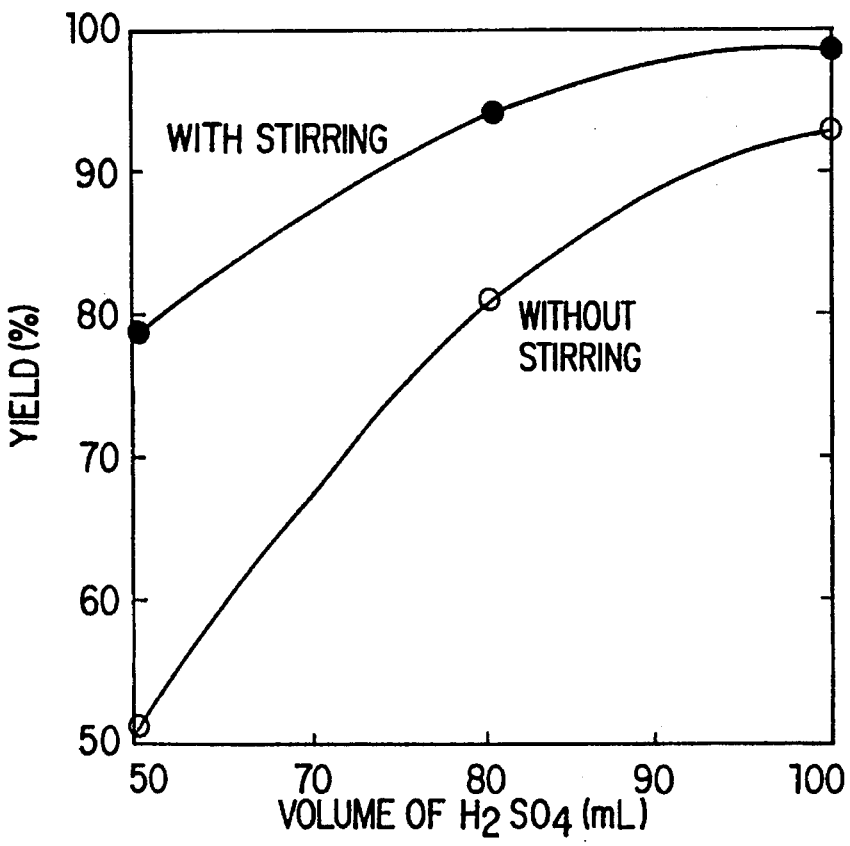
FIG. 5 is a diagram showing the effect of stirring on chromyl chloride yield in accordance with one embodiment of the process of this invention.

As can be seen from FIG. 4, temperature has only a small effect on chromyl chloride yield for the range of variables tested here in accordance with the process of this invention. But it has a significant effect on the decomposition of chromyl chloride. The yield of chromyl chloride decreases slightly at higher temperatures, greater than about 20° C., for low sulfuric acid concentrations (<8M) but remains constant for high sulfuric acid additions (FIG. 4). Low temperatures suppress the decomposition reaction resulting in higher yields of chromyl chloride. The control of reaction temperature is closely associated with stirring the aqueous solution as shown in FIG. 5. In the absence of stirring, large temperature gradients tend to form in the reaction mixture. To prevent these gradients and maintain the low temperatures needed for the synthesis, slower and slower rates of addition of sulfuric acid are necessary. Large temperature gradients allow the decomposition reactions to become significant, thereby decreasing the chromyl chloride yield. Stirring provides uniform cooling to overcome the effects of these local temperature gradients. Intensive stirring minimizes temperature gradients and allows a better control of the temperature; however, it also prevents a rapid physical separation of the $CrO_2Cl_2$ phase.

Using statistical-analytical tools, we have determined the optimal conditions necessary for chromyl chloride synthesis in accordance with the process of this invention. Table 1 shows a design matrix for a $2^3$ factorial experiment in which three quantitative variables—HCl, $H_2SO_4$, and temperature. The response is the yield of chromyl chloride. It lists a set of eight ($2^3$) possible different experimental conditions and the chromyl chloride yield (response) under these conditions. The data were collected as a part of a laboratory-scale investigation of the chromyl chloride process of this invention and have been simplified somewhat for illustrative purposes. The effects of the quantitative variables on yield is interpreted in terms of "two levels" (high and low). Though the response depends, of course, on the absolute values of the variables, the experimental design of Table 1 allows a rapid comparison of the relative effects of these variables. The statistical analysis of the data in Table 1 is shown in Table 2.

From Tables 1 and 2, it is evident that the effect of sulfuric acid level on the yield of chromyl chloride is predominant. Its effect is one order of magnitude higher than that of other variables. Chromyl chloride yield increases by 30% units when the quantity of sulfuric acid is increased from 60 mL to 100 mL, keeping the other variables constant. HCl has a negative effect on the chromyl chloride yield. An increase in the amount of 38% HCl added leads to a decrease in chromyl chloride yield. The overall effect of HCl addition is estimated to decrease the chromyl chloride yield by about 5% units. By increasing the temperature from 10° to 20° C. the estimated overall effect is a decrease in the chromyl chloride yield by about one percentage unit. This decrease is of the same order as the standard error of the yield data. Thus, it is difficult to assign significance to the effect of temperature on the yield.

TABLE 1

Factorial Design of the $CrO_2Cl_2$
Experiments at Two Levels
Initial chromic acid concentration = 200 g/L
Volume of the sample = 50 mL

| Test Condition # | HCl Volume (mL) | $H_2SO_4$ Volume (mL) | Temp. (°C.) | Yield (%) |
|---|---|---|---|---|
| 1. | 37.5 | 60 | 10 | 72.42 |
| 2. | 62.5 | 60 | 10 | 62.23 |
| 3. | 37.5 | 100 | 10 | 97.87 |
| 4. | 62.5 | 100 | 10 | 96.04 |
| 5. | 37.5 | 60 | 20 | 69.85 |
| 6. | 62.5 | 60 | 20 | 61.73 |
| 7. | 37.5 | 100 | 20 | 97.22 |
| 8. | 62.5 | 100 | 20 | 95.62 |

TABLE 2

Effects Calculated for the $2^3$ Factorial Design of $CrO_2Cl_2$ Synthesis Experiments

| Effect | Estimate ± Standard Error |
|---|---|
| Average | 81.62 ± 0.74 |
| Main effects | |
| HCl | −5.45 ± 1.48 |
| $H_2SO_4$ | 30.13 ± 1.48 |
| T (Temperature) | −1.04 ± 1.48 |
| Two factor effects | |
| HCl × T | 0.58 ± 1.48 |
| $H_2SO_4$ × T | 0.05 ± 1.48 |
| HCl × $H_2SO_4$ | 3.72 ± 1.48 |
| Three factor effect | |
| T × HCl × $H_2SO_4$ | 0.46 ± 1.48 |

In summary, both acids have a strong, interactive effect on the chromyl chloride yield, whereas the temperature effect is not significant for the range tested here. It is also worth noting that if experiments were carried out at temperatures well above about 20° C., the yield of chromyl chloride would be marginal.

We have determined that the rate of hydrolysis of chromyl chloride depends strongly on whether or not stirring is employed. Without stirring, hydrolysis takes a very long time, on the order of tens of minutes, to achieve completion whereas with stirring, the time needed for complete hydrolysis is on the order of seconds or tens of seconds, depending on the intensity of the stirring. The hydrolysis reaction is modelled as an instantaneous reaction with mass transfer resistance. The mathematical model proposed gives clear understanding about the rate of hydrolysis, and the extent of the reaction with time and their dependence on the rate of stirring, the transport properties of the reactants and the temperature of the reaction mixture.

Chromic acid is separated from the hydrolyzed solution in accordance with one embodiment of this invention as a chromate salt by the addition of a suitable alkali solution, for example KOH, followed by evaporation of the solution mixture to recover hydrochloric acid. Alternatively, chromic acid is precipitated as an insoluble salt. For the first method, the optimum conditions for obtaining pure hydrochloric acid solution are evaluated. For the second method, the choice of cation suitable for chromate precipitation as well as the choice of suitable (most soluble) salt of that cation are evaluated.

We have determined that the purity of the hydrochloric acid recovered by the first method depends on the concentration of the hydrolyzed mixture rather than the amount of KOH solution added. For high concentrations of hydrolyzed solution, chromic acid vapors are also seen to condense along with hydrochloric acid at about 110° C. Addition of excess KOH has no effect on this phenomenon. Not only the condensate, but also the solid obtained from the hydrolyzed solutions containing a high initial concentration of chromic acid showed traces of impurities. A pure hydrochloric acid solution is obtained when the initial concentration of chromic acid in the hydrolyzed solution is reduced (to less than 2M) and an equivalent amount of KOH is added to the reaction mixture and the analysis of solid obtained showed no traces of chloride.

Solubilities of various lead and chromate salts in water are listed in Table 3. It is evident that among chromates, lead chromate is the least soluble. Lead nitrate (solubility is 376.5 gm/L) and lead sulfate (solubility is 4.25 E-02 gm/L) are the most and the least soluble lead salts, respectively. (This excludes the carbonate, sulfide, and hydroxides of lead.)

TABLE 3

Solubilities of Various Chromates and Lead Salts

| Salt | log $K_{sp}$ | Solubility (M) |
|---|---|---|
| $Ag_2CrO_4$ | −11.5548 | 8.866E-05 |
| $BaCrO_4$ | −9.6681 | 1.465E-05 |
| $Cs_2Cr_2O_7$ | −17.7793 | 5.442E-04 |
| $PbCrO_4$ | −13.6848 | 1.438E-07 |
| $PbCrO_4$ | −13.6848 | 1.438E-07 |
| $PbSO_4$ | −7.8860 | 1.265E-04 |
| $PbCl_2$ | −4.7700 | 0.0162 |
| $Pb(NO_3)_2$ | — | 1.1367 |

From Table 3, it is clearly evident that the lead nitrate and lead chloride are the most suitable salts for precipitation of chromic acid as lead chromate. Experiments have shown that when an equivalent amount of lead nitrate solution is added to the hydrolyzed mixture, a pure yellow chrome precipitate is obtained along with a clear solution containing hydrochloric and nitric acids. A 100% chromium separation is obtained using a lead nitrate solution.

When a lead chloride solution is added to the hydrolyzed mixture, no clear solution, as in the case of nitrate, is obtained. Instead, a solution with a suspension is obtained which is analyzed later and a significant amount of chromium found. Addition of calcium hydroxide to this suspension yielded a precipitate of lead hydroxide, indicating incomplete precipitation of lead chromate. Addition of excess lead solution resulted in a co-precipitation of lead chloride due to the high concentrations of hydrochloric acid present in the hydrolyzed solution.

The specialty of this process lies in the fact that chromyl chloride can be synthesized from spent solutions using different reactants. For example, it can be synthesized using gaseous HCl or ferric chloride instead of acid HCl. The chromic acid can be separated in different forms from hydrolyzed chromyl chloride solutions—as an anhydrous compound ($CrO_3$), an alkali salt ($K_2Cr_2O_7$) or an insoluble chromate salt ($PbCrO_4$).

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for recovery of chromium in an aqueous solution comprising:

reacting hexavalent chromium in said aqueous solution with a reactant capable of converting said hexavalent chromium to chromyl chloride, forming chromyl chloride;

separating said chromyl chloride from said aqueous solution;

hydrolyzing said chromyl chloride to form a hydrolyzed solution comprising chromic acid and hydrochloric acid; and then treating said hydrolyzed solution to form one of a) chromic acid, b) an alkali chromate salt, or c) an insoluble chromate salt.

2. A process in accordance with claim 1, wherein said chromyl chloride is separated from said aqueous solution as a heavy underlayer.

3. A process in accordance with claim 1, wherein said chromyl chloride is separated from said aqueous solution by extraction into a solvent, forming an extractant.

4. A process in accordance with claim 3, wherein said extractant is distilled to recover chromyl chloride.

5. A process in accordance with claim 4, wherein said solvent is recycled to said extraction step.

6. A process in accordance with claim 1, wherein said reactant is selected from the group consisting of HCl gas, HCl liquid, chloride salts and mixtures thereof.

7. A process in accordance with claim 1, wherein said hydrolyzed solution is dried to recover chromium as anhydrous chromic acid.

8. A process in accordance with claim 1, wherein an alkali salt solution is added to said hydrolyzed solution, forming a mixture, and said mixture is evaporated, crystallizing an alkali chromate salt.

9. A process in accordance with claim 1, wherein a salt solution is added to said hydrolyzed solution, precipitating said chromic acid as said insoluble chromate salt.

10. A process in accordance with claim 1, wherein a KOH solution is added to said hydrolyzed solution, forming a mixture, and said mixture is evaporated, crystallizing a potassium dichromate salt.

11. A process in accordance with claim 1, wherein a lead solution is added to said hydrolyzed solution, precipitating said chromic acid as lead chromate.

12. A process in accordance with claim 1, wherein said hydrochloric acid is recovered and recycled for reaction with said chromium to form said chromyl chloride.

* * * * *